(12) United States Patent  (10) Patent No.: US 8,643,831 B1
Gregory et al.  (45) Date of Patent: Feb. 4, 2014

(54) DISTANCE TO ANGLE METROLOGY SYSTEM (DAMS) AND METHOD

(75) Inventors: Donald David Gregory, Fort Wayne, IN (US); Sheldon David Stokes, Fort Wayne, IN (US); David Charles Jordan, Fort Wayne, IN (US)

(73) Assignee: Exelis, Inc., McLean, VA (US)

( * ) Notice: Subject to any disclaimer, the term of this patent is extended or adjusted under 35 U.S.C. 154(b) by 865 days.

(21) Appl. No.: 12/709,569

(22) Filed: Feb. 22, 2010

(51) Int. Cl.
    *G01B 11/26* (2006.01)

(52) U.S. Cl.
    USPC .............. 356/139.07; 356/4.01; 356/3.01

(58) Field of Classification Search
    USPC .......... 356/3.01–3.15, 4.01–4.1, 5.01–5.15, 356/6–22, 28, 28.5, 139.01–139.1
    See application file for complete search history.

(56) References Cited

U.S. PATENT DOCUMENTS

| | | | | |
|---|---|---|---|---|
| 4,514,083 A | * | 4/1985 | Fukuoka | 356/3.08 |
| 5,929,983 A | * | 7/1999 | Lu | 356/138 |
| 2009/0195790 A1 | * | 8/2009 | Zhu et al. | 356/612 |

* cited by examiner

*Primary Examiner* — Luke Ratcliffe
(74) *Attorney, Agent, or Firm* — RatnerPrestia (57) ABSTRACT

A system for measuring movement of an object includes a source of light for emitting a beam; an object for receiving the beam from the source and reflecting the beam; and a reflective optic for receiving the beam reflected from the object and again reflecting the beam at a first angle. The system also includes a receiver for receiving the reflected beam from the reflective optic. When the object moves in distance, the reflective optic reflects the beam at a second angle. The reflective optic may be replaced by an equivalent refractive optic(s). The receiver measures movement of the object, based on a difference between the first angle and the second angle. The reflective optic may include a cylindrical reflective optic, or a spherical reflective optic. The refractive optic(s) may include a plano hemispheric refractive optic, or a meniscus refractive optic. The receiver may include a quad-cell imaging system, or a focal plane array (FPA). The source of light may include a laser, or any collimated beam source.

18 Claims, 12 Drawing Sheets

DISTANCE TO ANGLE METROLOGY SYSTEM (DAMS) AND METHOD

FIELD OF INVENTION

The present invention relates, in general, to a method and system for measuring small distances from a reference point that is relatively far away. More specifically, the present invention relates to an optical system for measuring small movements of an object based on angle changes of an optical beam transmitted toward the object.

BACKGROUND OF THE INVENTION

Requirements exist for making very, small accurate distance measurements (approximately 1 to 500 microns) from a reference point that is far away (approximately 1 to 2 meters). In addition, such measurements are typically required to be made when the object being measured is in a vacuum chamber at cryogenic temperatures. The object being measured is under limited access due to its location in the vacuum chamber and usually only an optical path to the object is available. Generally, some type of interferometric optical system is used to measure these small distances.

Interferometric fringe counting systems may be used to measure distances to the object. These fringe counting systems are difficult to set up and maintain, particularly in a vacuum chamber at cryogenic temperatures. These counting systems have very stringent alignment requirements that must be maintained.

Fringe counting by these systems becomes harder if the distances to be measured approach several hundred microns. Vacuum compatible lasers needed for fringe counting systems are expensive and hard to properly operate. Windows in vacuum chambers may cause Etalon effects which make it difficult to move a laser out of the vacuum chamber and still be able to count fringes. Finally, for very accurate distance measurements, an exact wavelength of the laser needs to be known and kept stable. The exactness and stability of the laser wavelength are a function of the metrology error that may be tolerated, but usually are a small fraction of the wavelength.

In general, it takes an elaborate thermal and power control system to maintain the stability of the laser wavelength, and often the laser wavelength must be monitored with an additional measuring system to insure that the stability is maintained. In addition, the optical path must be able to transmit the output of the laser wavelength through narrow band pass optical devices, in which the optical band pass may not encompass an available laser wavelength.

As will be explained, the present invention avoids the complexities associated with fringe counting systems. Any optical beam source may be used by the present invention and a laser source is not necessary. Elaborate band pass filters are not necessary and a simple receiver may be used by the present invention to determine a spot movement, or angle change, in the optical beam to determine a distance movement in the target under observation. The optical path is easy and simple to set up.

SUMMARY OF THE INVENTION

To meet this and other needs, and in view of its purposes the present invention provides a system for measuring movement of an object. The system includes a source of light for emitting a beam; an object for receiving the beam from the source and reflecting the beam; and a reflective optic for receiving the beam reflected from the object and reflecting the beam at a first angle. A receiver is included for receiving the reflected beam from the reflective optic. When the object moves in distance, the reflective optic reflects the beam at a second angle. The receiver measures movement of the object, based on a difference between the first angle and the second angle.

The reflective optic may be a cylindrical reflective optic, or a spherical reflective optic. The receiver may include a quad-cell imaging system, a position sensitive detector (PSD), or a focal plane array (FPA). The source of light may include a laser, or a collimated beam source.

The object includes a reflective surface for receiving and reflecting the beam at an angle of theta ($\theta$) with respect to a normal direction from the reflective surface. The reflective surface includes a mirror mounted on the object for receiving and reflecting the beam. The beam is reflected from the object to strike the reflective optic at the first angle with respect to a normal direction from the reflective optic, and the first angle is formed before movement of the object ($\Delta z=0$). The beam is next reflected from the object to strike the reflective optic at the second angle with respect to a normal direction from the reflective optic, and the second angle is formed after movement of the object by a distance of $\Delta z$.

An adjustable lens may be disposed between the source of light and the target for focusing the beam of light at a location adjacent to the reflective optic. The adjustable lens may include a mirror.

Another embodiment of the present invention includes an optical bench having a source of light for transmitting a light beam; an object under test subject to movement in a z-direction, the object receiving and reflecting the light beam toward a reflective optic; and the reflective optic including a circular portion of radius R, the radius and the z-direction formed in the same plane. The reflective optic is configured to receive the light beam from the object at a first location along the circular portion, when the object movement is zero in the z-direction. The reflective optic is configured to receive the light beam from the object at a second location along the circular portion, when the object moves by a distance of $\Delta z$ in the z-direction. A receiver receives the light beam from the first location and the second location and determines the distance $\Delta z$.

The object under test may include a mirror adjusted by motion of a piston.

The reflective optic may include a cylindrical reflective optic having a radius of R, or a spherical reflective optic having a radius of R.

The receiver is configured to receive the light beam from the first location at a first angle with respect to a normal extended from the reflective optic in the plane, and receive the light beam from the second location at a second angle with respect to another normal extended from the reflective optic in the plane. The receiver determines the distance $\Delta z$ based on a difference between the first angle and the second angle.

Yet another embodiment of the present invention includes an optical bench having a source of light for transmitting a light beam; an object under test subject to movement in a z-direction, the object receiving and reflecting the light beam toward a refractive optic; and the refractive optic including a curved portion formed in the z-direction. The refractive optic is configured to receive the light beam from the object at a first location along the curved portion, when the object movement is zero in the z-direction. The refractive optic is configured to receive the light beam from the object at a second location along the curved portion, when the object moves by a distance of $\Delta z$ in the z-direction. A receiver receives the light beam from the first location and the second location and determines the distance $\Delta z$.

The refractive optic may include a plano hemispheric refractive optic, or a meniscus refractive optic.

Still another embodiment of the present invention is a method of determining distance moved by an object under test. The method includes the steps of: (a) reflecting a beam of light from the object toward a reflective optic; (b) reflecting the same beam of light from the reflective optic toward a receiver; (c) moving the object and repeating steps (a) and (b); and (d) sequentially receiving the beams of light by a receiver, and determining the distance moved by the object.

Reflecting the beam of light from the object includes sequentially impinging the reflective optic at a first location and a second location; and sequentially receiving the beams of light by the receiver includes determining angles between (i) a respective reflected beam of light from the object and (ii) a respective normal to the reflected optic at the first and second locations.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

The present invention, also referred to herein as a distance to angle metrology system (DAMS), avoids complexities associated with conventional counting fringe systems and costs associated with using specific wavelengths of laser light. As will be explained, the present invention measures distance movement of an object by converting a distance movement into an angular movement and, instead, measuring the latter.

The present invention uses commercial, off the shelf (COTS) components which are readily available. The set up of the present invention is easy and straight forward. The present invention includes a collimated beam source, which does not have to be a laser source. It uses a mirror to reflect a beam from the target, but any shiny surface is actually sufficient. The present invention also uses a cylindrical, reflective optic and a simple receiver. The receiver may be a quad-cell, or a small focal planar array (FPA) combined with a simple imaging system. The receiver may be used to determine the spot movement, or angle change, of the optical beam. The change in the angle of the optical beam may be used to determine the change in distance of the object.

As will be explained, the present invention converts small distance movements of a target (or an object under test) into angle changes of a light beam. Changes in the angle of the light beam may be measured very accurately by an auto-collimating receiver, by a quad-cell imaging system, or by a focal plane array (FPA) imaging system. Angle changes of less than 0.5 micro-radians may be easily measured with COTS equipment. The present invention may use any wavelength of light, from visible to long-wave infrared light. Of course, the simplest wavelength of light is to use visible light if the test condition allows it.

Figure 1:
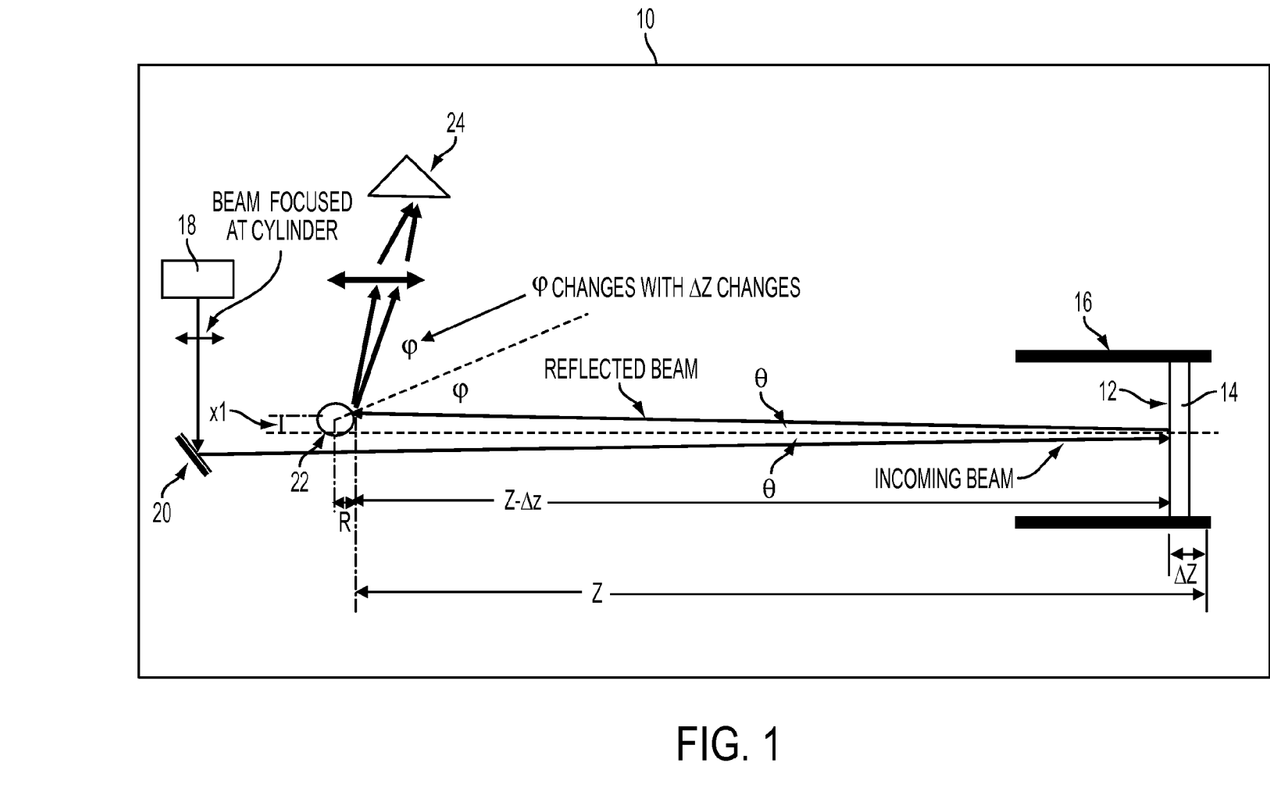
FIG. 1 is a diagram of a path undertaken by a beam of light between an optical source and an optical receiver in a distance to angle metrology system (DAMS), which includes a reflective optic, in accordance with an embodiment of the present invention.

Referring now to FIG. 1, there is shown an embodiment of the present invention, generally designated as DAMS 10. As shown, DAMS 10, which may be on an optical bench, includes a small mirror 12 mounted on object 14, which is moveable using a translation stage, generally designated as 16. At the opposite end of the optical bench, DAMS 10 includes beam source 18 transmitting an optical beam, which is redirected by way of an adjustable mirror 20 (or an adjustable lens 20), toward mirror 12. The optical beam, which is labeled as an incoming beam, when moving toward mirror 12, is focused by the adjustable mirror (by way of an adjustable holder). The focusing adjustment allows the incoming beam to strike mirror 12 at an angle of θ. The reflected beam from mirror 12 is returned, also at an angle of θ, and strikes the cylindrical reflective optic, generally designated as 22. The reflected beam is reflected from the cylindrical reflective optic and received by an auto-collimator receiver 24 (for example), which may include a quad cell or an FPA imaging system. The present invention measures the movement of the object 14 through a small distance of Δz. It will be appreciated that if object 14 is itself reflective, then mirror 12 may be omitted.

The incoming beam sent to mirror 12 may be a small collimated beam of light, as shown in FIG. 1. The angle to the normal of the mirror, θ, may be very small, if needed to access the object or component to be measured (for example θ may have an angle less than 1 degree). The reflected beam returns and strikes the cylindrical reflective optic 22 and is reflected into the auto-collimator receiver 24, or other suitable receiver. If the target, or object moves (in the z axis), or moves by piston motion (in the z axis) a small distance, Δz, then the reflected beam strikes the cylindrical optic at a different location and the reflected beam bouncing from the cylinder shifts to a different angle. This angle shift may then be recorded by the receiver 24.

For many applications, it is difficult to form a collimated beam whose width is small enough to function well with the components that are available on an optical bench. In such applications, the collimated beam of light may be brought to a focus at the surface of the cylindrical optic (approximately) by using a simple imaging system (for example, a lens). In general, the chief ray follows the same optical path as the collimated beam of light and a motion of Δz produces an angular shift in the direction of the chief ray.

The present invention may be used in many environments, but is ideal for use in a laboratory environment or in a vacuum chamber. The present invention provides a simple method to measure small distance changes (such as on the order of microns) of an object from a relatively far measuring distance (such as 2 meters). For example, the auto-collimator receiver may be 2 meters away from the object, as the object is moved in one axis, by an amount of Δz, which may be less than 100 microns.

A variation that may be included in the present invention is replacing the cylindrical reflective optic with a spherical reflective optic. Such a variation allows for angular signals to be measured in two orthogonal axes. These orthogonal angular signals further provide benefits, especially in a noisy environment.

The DAMS configuration shown in FIG. 1 advantageously offers high sensitivity and, therefore, allows the same configuration to be applied to many applications where dynamic range, sensitivity, distance from the object, etc., are different. The shown configuration only needs to be adjusted by varying its design parameters appropriately. For example, depending on distance from the optical source to the target, the optical beam may be adjusted by optical device 18 and/or adjustable mirror 20, so that it focuses properly on the cylindrical reflective optic 22 and avoids beam width problems.

It will be appreciated that the reflected beam, which is shown as a ray (chief ray), represents a small, collimated beam of light that is focused (approximately) by a lens (or mirror 20) onto the surface of the cylindrical reflective optic 22, where the latter has a radius R. The chief ray strikes mirror 12 at an angle θ. The mirror 12 reflects the light, with the chief ray also at an angle θ. The reflected light returns and strikes the cylindrical reflective optic 22, so that the angle of the chief ray to the reflective cylinder's normal is at an angle φ. The chief ray is then also reflected at an angle φ to the cylinder's normal toward receiver 24. If mirror 12 (or the object 14) moves a distance of Δz, then the angle φ changes and the auto-collimator receiver 24 measures that change.

Figure 2A:
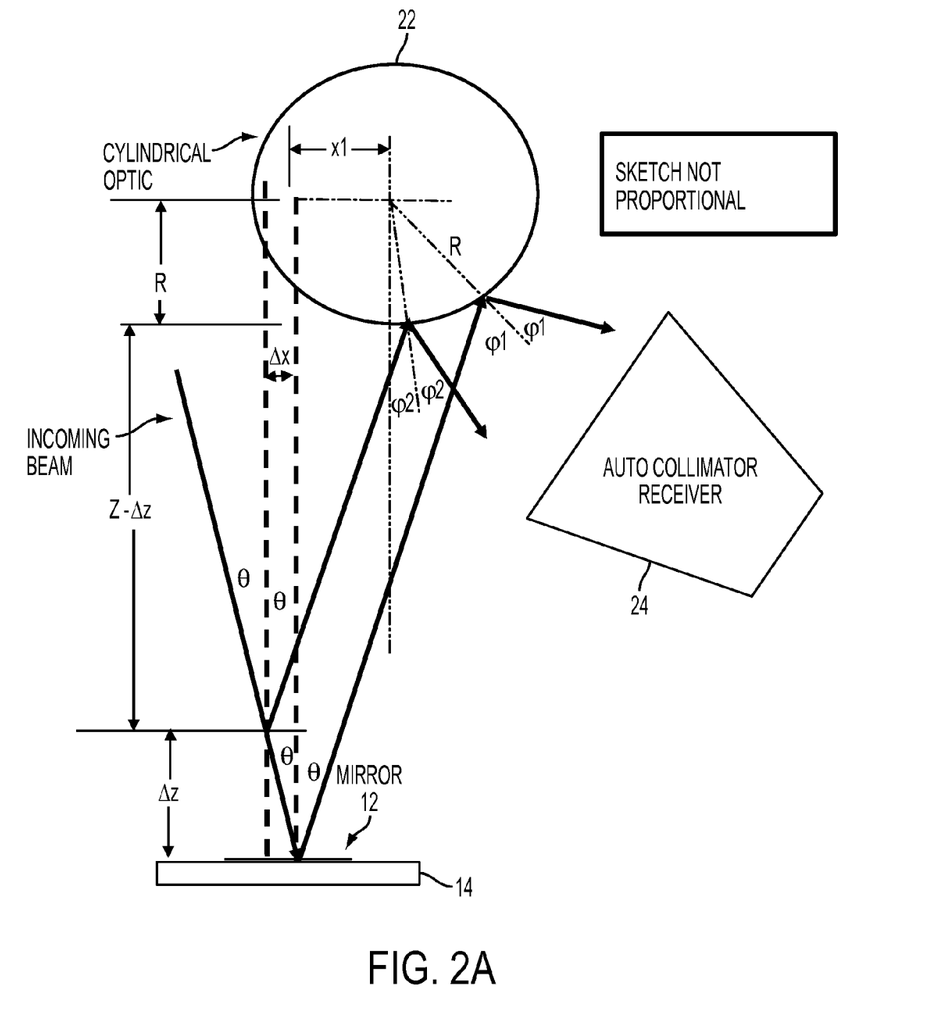
FIG. 2A is a diagram of rays of light impinging upon a reflective optic, disposed between an object under test and an auto collimator receiver, in accordance with an embodiment of the present invention.

FIG. 2A, which is not drawn to proper proportions, but drawn to emphasize the angle shifts, illustrates a fundamental principle of the present invention. The incoming beam, shown as a ray, may either be the chief ray of the focused beam, or the ray of the beam if the beam is collimated. The mathematics derived from the illustrated geometry is correct for either case.

The geometry illustrated in FIG. 2A shows that the angle φ changes due to Δz movement of the mirror, or object under test. As the mirror moves by an amount of Δz, the location at which the reflected beam impinges upon cylindrical optic 22 also changes from φ2 to φ1.

Figure 2B:
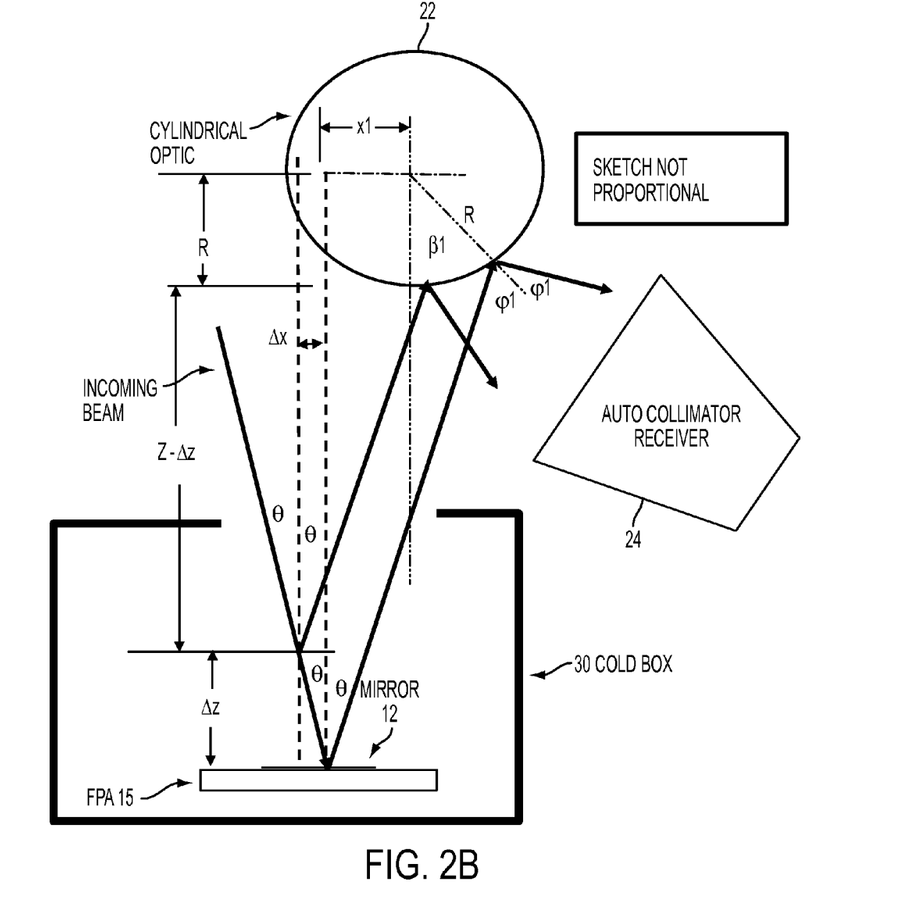
FIG. 2B is a diagram of rays of light impinging upon a reflective optic, disposed between an object under test and an auto collimator receiver, where the object under test is disposed in a cold box, in accordance with another embodiment of the present invention.

A similar geometry is illustrated in FIG. 2B, except that the object is an FPA, generally designated as 15, which is inserted within cold box 30. The cylindrical optic 22 and receiver 24 are disposed outside of cold box 30.

Figure 3:
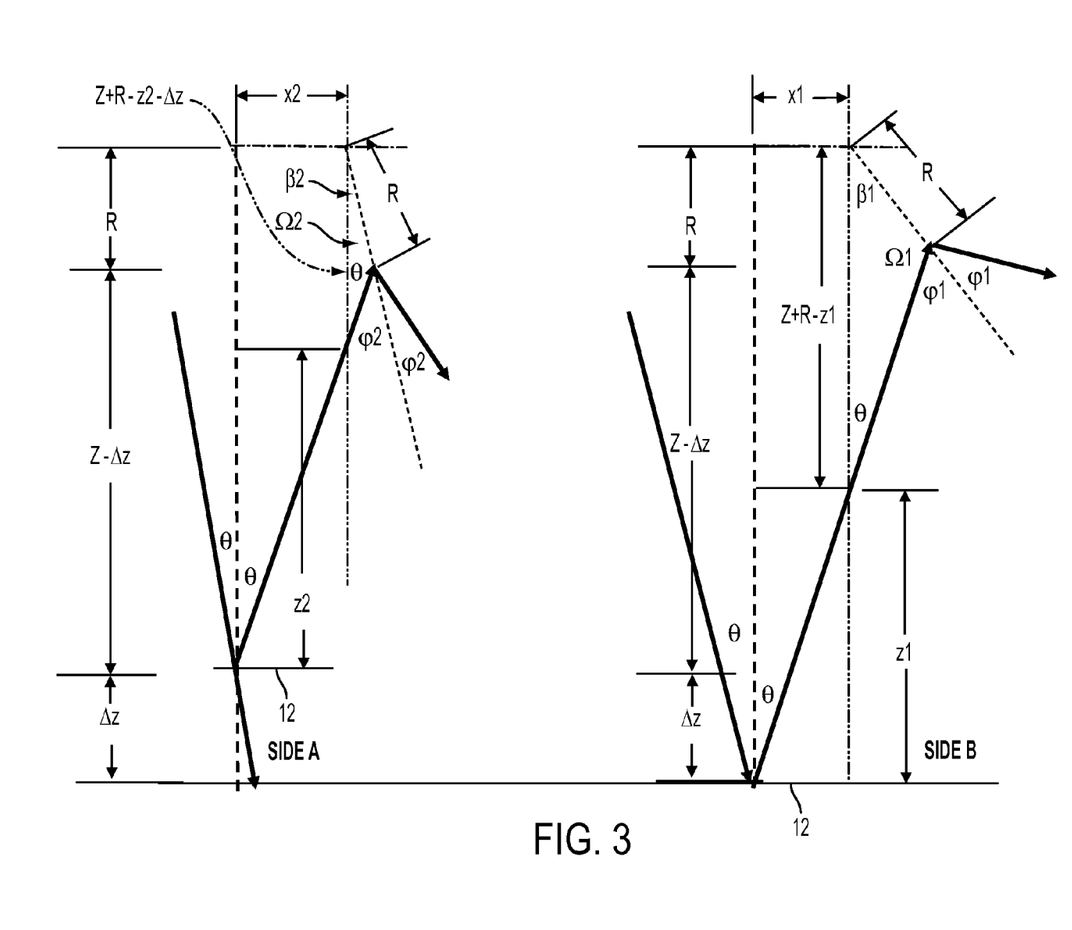
FIG. 3 is a diagram of rays of light impinging upon and reflected from an object under test, prior to movement of the object, and after movement of the object, in accordance with an embodiment of the present invention.
Figure 4:
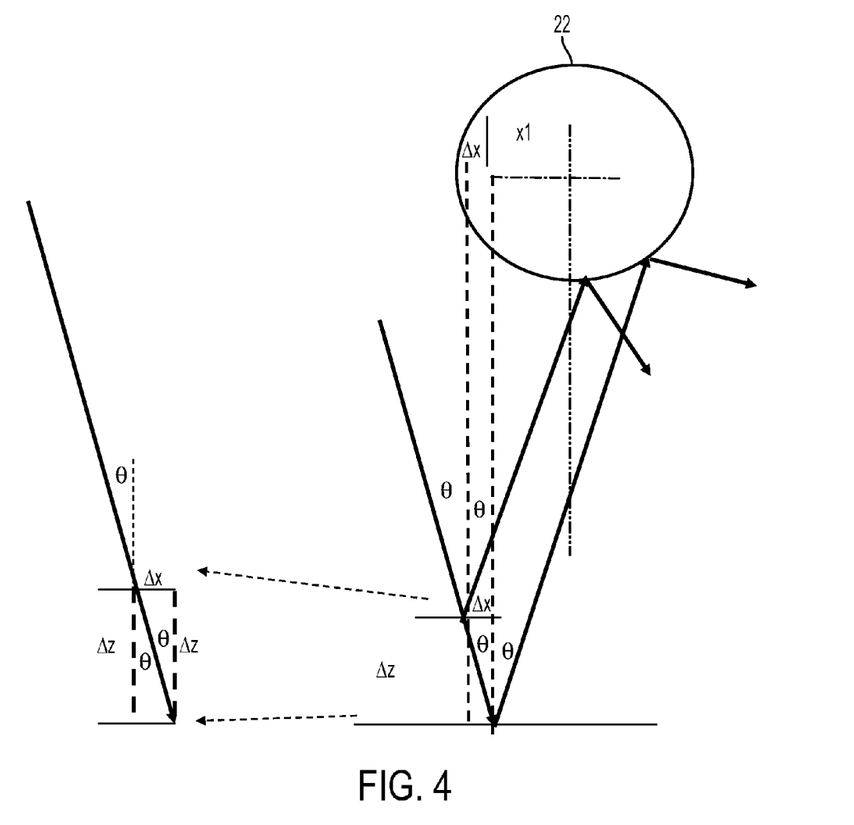
FIG. 4 is a diagram of rays of light striking a reflective optic at two different locations on a portion of the circular surface of the reflective optic, in accordance with an embodiment of the present invention.

The equations governing the present invention are developed below by referring to FIGS. 3 and 4, which better illustrate the geometry used in FIGS. 2A and 2B. Two sides are illustrated in FIG. 3, namely side A and side B. Side A emphasizes a starting geometry, before the object is moved; side B emphasizes a geometry after a displacement of Δz by the object. Each side shows an incoming beam impinging on object 12 and a reflected beam being reflected from object 12.

As may be seen from side A of FIG. 3:

$$\Omega 2 = \pi - \beta 2 - \theta \qquad \text{Equation 1}$$

$$\Omega 2 = \pi - \phi 2 \qquad \text{Equation 2}$$

Combining equations 1 and 2, one obtains:

$$\theta = \phi 2 - \beta 2 \qquad \text{Equation 3}$$

In a similar manner, the following equations are obtained by examining side B:

$$\Omega 1 = \pi - \beta 1 - \theta \qquad \text{Equation 4}$$

$$\Omega 1 = \pi - \phi 1 \qquad \text{Equation 5}$$

Combining equations 4 and 5, one obtains:

$$\theta = \phi 1 - \beta 1 \qquad \text{Equation 6}$$

Combining equations 3 and 6, one obtains a difference between the two angles (φ1–φ2) in terms of a difference between the two beta angles (β1–β2):

$$\phi 1 - \phi 2 = \beta 1 - \beta 2 \equiv \Delta \beta \qquad \text{Equation 7}$$

To find the first beta angle, the law of sines may be used:

$$\frac{R + Z - z1}{\sin(\Omega 1)} = \frac{R}{\sin(\theta)} \qquad \text{Equation 8}$$

From equation 4 and the sine identities, one obtains:

$$\sin(\Omega 1) = \sin(\pi - \beta 1 - \theta) = \sin(\beta 1 + \theta) \qquad \text{Equation 9}$$

Combining equations 8 and 9, one obtains:

$$\sin(\beta 1 + \theta) = \frac{R + Z - z1}{R} \cdot \sin(\theta) \qquad \text{Equation 10}$$

From equation 10, one obtains:

$$\beta 1 = \sin^{-1}\left[\frac{R + Z - z1}{R} \cdot \sin(\theta)\right] - \theta \qquad \text{Equation 11}$$

From FIG. 2 one may see that:

$$z1 = \frac{x1}{\tan(\theta)} \qquad \text{Equation 12}$$

Combining equation 12 and equation 11, one obtains:

$$\beta 1 = \sin^{-1}\left[\frac{\sin(\theta)}{R} \cdot \left(R + Z - \frac{x1}{\tan(\theta)}\right)\right] - \theta \quad \text{Equation 13}$$

To find the second beta angle, the same procedure may be followed. Using the law of sines one obtains:

$$\frac{R + Z - \Delta z - z2}{\sin(\Omega 2)} = \frac{R}{\sin(\theta)} \quad \text{Equation 14}$$

From equation 1, one obtains:

$$\sin(\Omega 2) = \sin(\pi - \beta 2 - \theta) = \sin(\beta 2 + \theta) \quad \text{Equation 15}$$

Combining equations 14 and 15, one obtains:

$$\sin(\beta 2 + \theta) = \frac{R + Z - \Delta z - z2}{R} \cdot \sin(\theta) \quad \text{Equation 16}$$

From FIG. 2 one obtains:

$$z2 = \frac{x2}{\tan(\theta)} \quad \text{Equation 17}$$

and $$x2 = x1 + \Delta x \quad \text{Equation 18}$$

Next, using FIG. 4, one may determine $\Delta x$, as follows:

$$\Delta x = \Delta z \cdot \tan(\theta) \quad \text{Equation 19}$$

Combining equations 17, 18 and 19, one obtains:

$$z2 = \frac{x1 + \Delta z \cdot \tan(\theta)}{\tan(\theta)} \quad \text{Equation 20}$$

Combining equations 16, 17 and 20, one obtains:

$$\sin(\beta 2 + \theta) = \frac{\sin(\theta)}{R} \cdot \left[Z + R - \Delta z - \frac{x1 + \Delta z \cdot \tan(\theta)}{\tan(\theta)}\right] \quad \text{Equation 21}$$

$$\beta 2 = \sin^{-1}\left[\frac{\sin(\theta)}{R} \cdot \left[Z + R - \Delta z - \frac{x1 + \Delta z \cdot \tan(\theta)}{\tan(\theta)}\right]\right] - \theta \quad \text{Equation 22}$$

$$\beta 2 = \sin^{-1}\left[\frac{\sin(\theta)}{R} \cdot \left[Z + R - 2 \cdot \Delta z - \frac{x1}{\tan(\theta)}\right]\right] - \theta \quad \text{Equation 23}$$

Combining equations 7, 13 and 23, one obtains:

$$\Delta \beta = \varphi 1 - \varphi 2 = \sin^{-1}\left[\frac{\sin(\theta)}{R} \cdot \left(R + Z - \frac{x1}{\tan(\theta)}\right)\right] - \sin^{-1}\left[\frac{\sin(\theta)}{R} \cdot \left[Z + R - 2 \cdot \Delta z - \frac{x1}{\tan(\theta)}\right]\right] \quad \text{Equation 24}$$

It will be appreciated that the "2 $\Delta z$" term in the $\beta 2$ term (equation 23) is the only difference between the two angles ($\beta 1$, $\beta 2$). Thus, when $\Delta z = 0$, the two angles become the same, as they should.

Equation 24 may be provided to the designer to establish workable parameters of DAMS, in the present invention, for a specific test of interest. However, the tester determines the $\Delta z$, once the $\Delta \beta$ angle difference is measured. The $\Delta z$ may be found by reversing equation 24, as follows:

$$\Delta \beta - \sin^{-1}\left[\frac{\sin(\theta)}{R} \cdot \left(R + Z - \frac{x1}{\tan(\theta)}\right)\right] = \quad \text{Equation 25}$$
$$-\sin^{-1}\left[\frac{\sin(\theta)}{R} \cdot \left(R + Z - \frac{x1}{\tan(\theta)}\right) - \frac{2 \cdot \sin(\theta) \cdot \Delta z}{R}\right]$$

$$\frac{2 \cdot \Delta z \cdot \sin(\theta)}{R} - \frac{\sin(\theta)}{R} \cdot \left(R + Z - \frac{x1}{\tan(\theta)}\right) = \quad \text{Equation 26}$$
$$\sin\left[\Delta \beta - \sin^{-1}\left[\frac{\sin(\theta)}{R} \cdot \left(R + Z - \frac{x1}{\tan(\theta)}\right)\right]\right]$$

$$\frac{2 \cdot \Delta z \cdot \sin(\theta)}{R} = \frac{\sin(\theta)}{R} \cdot \left(R + Z - \frac{x1}{\tan(\theta)}\right) + \quad \text{Equation 27}$$
$$\sin\left[\Delta \beta - \sin^{-1}\left[\frac{\sin(\theta)}{R} \cdot \left(R + Z - \frac{x1}{\tan(\theta)}\right)\right]\right]$$

$$\Delta z = \frac{1}{2} \cdot \left\{R + Z - \frac{x1}{\tan(\theta)}\right\} + \quad \text{Equation 28}$$
$$\frac{R}{2 \cdot \sin(\theta)} \cdot \sin\left[\Delta \beta - \sin^{-1}\left[\frac{\sin(\theta)}{R} \cdot \left(R + Z - \frac{x1}{\tan(\theta)}\right)\right]\right]$$

Thus, equation 28 yields the distance moved by the target as a function of the measured $\Delta \beta$.

Figure 5:
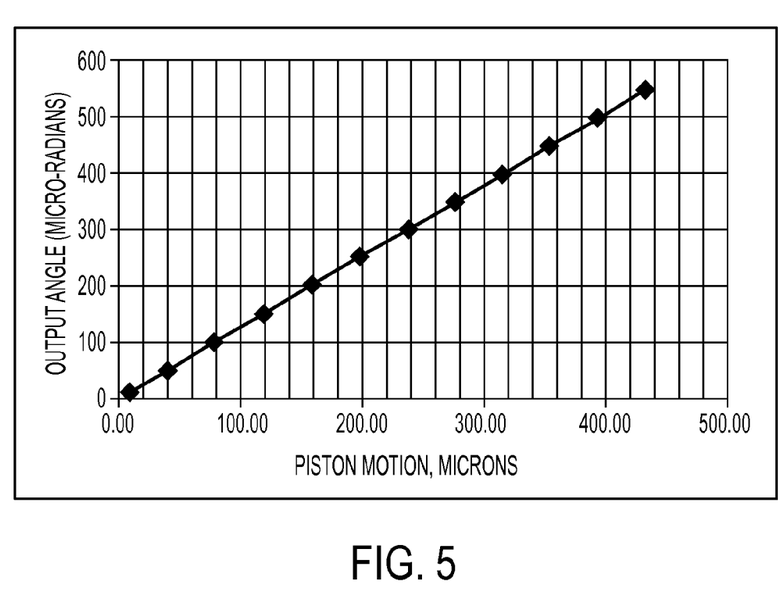
FIG. 5 is a plot of output angles on a reflective optic versus motion of an object, in accordance with an embodiment of the present invention.

Exemplary calculations for determining a change in distance, $\Delta z$, of an object are shown below, based on parameters taken from FIG. 1. Table 1 shows the setup parameters used in the example. FIG. 5 displays the data of Table 1, showing excellent linearity between the output angles versus the movements (piston motions) of the object.

TABLE 1

Parameter Set and Results Corresponding to Example.

| R<br>m | Z<br>m | x1<br>m | $\theta$<br>deg | $\Delta\beta$<br>micro-rad | $\Delta z$<br>microns |
|---|---|---|---|---|---|
| 0.025 | 2.1 | 0.01 | 0.7 | 10 | 7.87 |
| 0.025 | 2.1 | 0.01 | 0.7 | 50 | 39.37 |
| 0.025 | 2.1 | 0.01 | 0.7 | 100 | 78.75 |
| 0.025 | 2.1 | 0.01 | 0.7 | 150 | 118.13 |
| 0.025 | 2.1 | 0.01 | 0.7 | 200 | 157.51 |
| 0.025 | 2.1 | 0.01 | 0.7 | 250 | 196.89 |
| 0.025 | 2.1 | 0.01 | 0.7 | 300 | 236.27 |
| 0.025 | 2.1 | 0.01 | 0.7 | 350 | 275.65 |
| 0.025 | 2.1 | 0.01 | 0.7 | 400 | 315.04 |
| 0.025 | 2.1 | 0.01 | 0.7 | 450 | 354.43 |
| 0.025 | 2.1 | 0.01 | 0.7 | 500 | 393.82 |
| 0.025 | 2.1 | 0.01 | 0.7 | 550 | 433.21 |

In a proof of principle test, an incoming beam is focused by a lens (as shown in FIG. 1). The lens is placed so that its focal point is on the surface of the cylinder (the point where the reflected beam hits the cylinder). The reflected beam is collected by a lens at a convenient location close to the cylinder, collecting the light reflected from the cylinder without vignetting. The light is then imaged onto the quad cell at the infinite focus conjugate of the lens (an FPA would be better, but a quad cell is what was used for the proof of principle test due to equipment availability).

On the quad cell, a line appears. The line thickness comes from the dimension out of the page that is not affected by the cylinder. The linear dimension (the line) on the quad cell is due to the spread of the beam, in the page. To first order, the divergence is collimated and, therefore, appears as a line in this dimension. As the object is moved a distance $\Delta z$, the line on the quad cell also moves, because the chief ray's angle (in the dimension of the page) changes significantly. The line on the quad cell shifts and may be measured.

Figure 6:
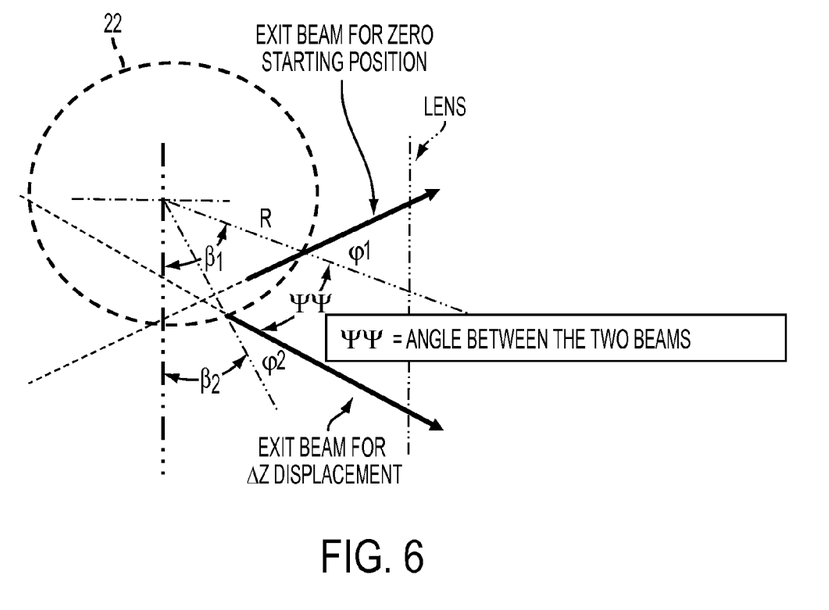
FIG. 6 is a diagram of a reflective optic, showing beam displacement on the reflective optic resulting from movement of an object under test, in accordance with an embodiment of the present invention.

The shift of the line on the quad cell represents an angle change. FIG. 6 shows the relationship between the chief ray reflected from the reflective cylinder at the mirror's (or object's) zero position ($\Delta z=0$) and the chief ray reflected from the reflective cylinder for a mirror's (or object's) displacement of a finite $\Delta z$.

The angles $\beta 1$, $\beta 2$, and $\phi 1$-$\phi 2$ (see FIG. 6) are given by equations 13, 23 and 7, respectively. The $\psi\psi$ is the angle between the two reflected, exit beams and, as may be seen in the figure, is given by:

$$\Psi\Psi=\beta 1+\phi 1-\beta 2-\phi 2=(\beta 1-\beta 2)+(\phi 1-\phi 2) \quad \text{Equation 29}$$

Using equation 7, one obtains:

$$\Psi\Psi=2\cdot(\beta 1-\beta 2) \quad \text{Equation 30}$$

For the proof of principle test, one may calculate Table 2, as shown below, including parameters $\psi\psi$ versus $\Delta z$.

TABLE 2

$\psi\psi$ versus $\Delta z$.

| x1 m | $\Delta z$ microns | R m | Z m | $\theta$ deg | $\theta$ rad | $\beta 1$ rad | $\beta 2$ rad | $\beta 1$-$\beta 2$ micro-rad | $\psi\psi$ micro-rad |
|---|---|---|---|---|---|---|---|---|---|
| 0.0094 | 50 | 0.026 | 1.5 | 1.15 | 0.020071 | 0.955297 | 0.955164 | 133.6843 | 267.3686 |
| 0.0094 | 100 | 0.026 | 1.5 | 1.15 | 0.020071 | 0.955297 | 0.95503 | 267.3433 | 534.6866 |
| 0.0094 | 150 | 0.026 | 1.5 | 1.15 | 0.020071 | 0.955297 | 0.954896 | 400.9771 | 801.9542 |
| 0.0094 | 200 | 0.026 | 1.5 | 1.15 | 0.020071 | 0.955297 | 0.954763 | 534.5857 | 1069.1713 |
| 0.0094 | 250 | 0.026 | 1.5 | 1.15 | 0.020071 | 0.955297 | 0.954629 | 668.1690 | 1336.3380 |
| 0.0094 | 300 | 0.026 | 1.5 | 1.15 | 0.020071 | 0.955297 | 0.954495 | 801.7271 | 1603.4543 |
| 0.0094 | 350 | 0.026 | 1.5 | 1.15 | 0.020071 | 0.955297 | 0.954362 | 935.2601 | 1870.5202 |
| 0.0094 | 400 | 0.026 | 1.5 | 1.15 | 0.020071 | 0.955297 | 0.954228 | 1068.7679 | 2137.5358 |
| 0.0094 | 450 | 0.026 | 1.5 | 1.15 | 0.020071 | 0.955297 | 0.954095 | 1202.2506 | 2404.5012 |
| 0.0094 | 500 | 0.026 | 1.5 | 1.15 | 0.020071 | 0.955297 | 0.953962 | 1335.7081 | 2671.4163 |
| 0.0094 | 550 | 0.026 | 1.5 | 1.15 | 0.020071 | 0.955297 | 0.953828 | 1469.1406 | 2938.2811 |
| 0.0094 | 600 | 0.026 | 1.5 | 1.15 | 0.020071 | 0.955297 | 0.953695 | 1602.5479 | 3205.0958 | slope = 2.670661 micro-rad/micron

Figure 7:
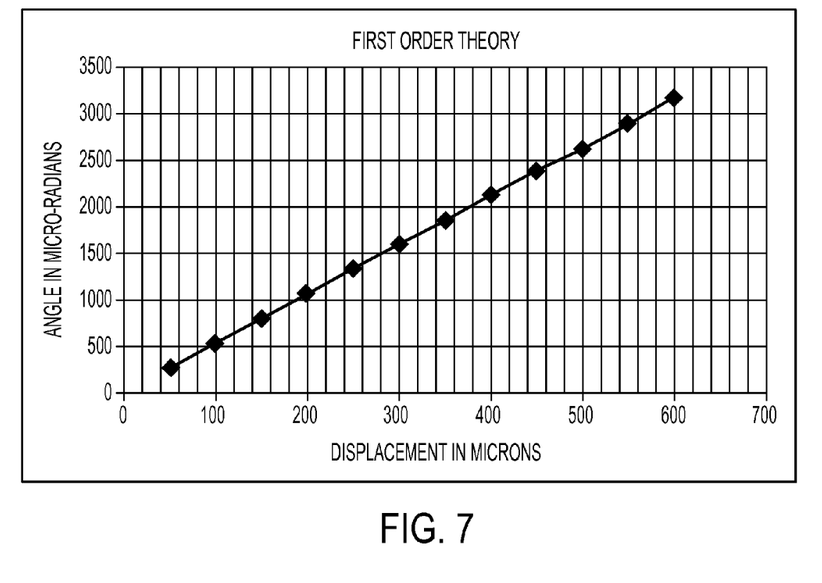
FIG. 7 is a plot of output angles versus displacement of an object, in accordance with an embodiment of the present invention.

FIG. 7 shows a plot of equation 30 versus $\Delta z$, namely a plot of $\psi\psi$ versus $\Delta z$. The plot is linear having a zero intercept and a slope (m) that may be expressed as follows:

$$m = 2.67 \cdot \frac{\text{micro-rads}}{\text{microns}} \quad \text{Equation 31}$$

Figure 8:
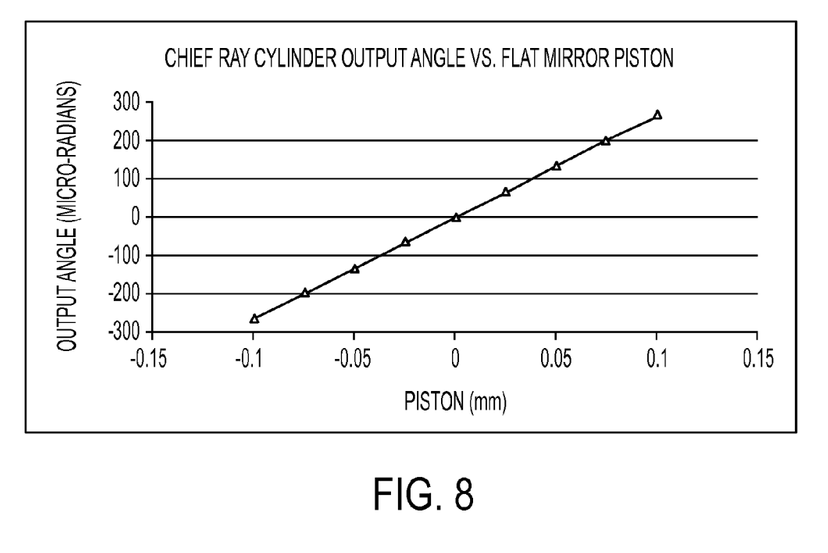
FIG. 8 is a plot of output angles versus movement of a flat mirror under movement of a piston, in accordance with an embodiment of the present invention.

The proof of principle test was also modeled on ZEMAX. The ZEMAX produced a $\psi\psi$ versus micro-meter displacement (as piston motion), as shown in FIG. 8. As shown, the predicted output angle versus the displacement is a straight line having a zero intercept and slope of m in micro-radians/microns, as follows:

$$m = 2.65 \cdot \frac{\text{micro-radians}}{\text{micron}} \quad \text{Equation 32}$$

The data used in FIG. 8 are provided in Table 3 below.

TABLE 3

The ZEMAX model predictions of mirror piston movement versus output angle.

| Flat Mirror Piston (mm) | Y Chief Ray (px = 0, py = 0) (mm) | Y(CR) − Y0(CR) (mm) | Y(CR) − Y0(CR) (Microradians) |
|---|---|---|---|
| 0 | 113.671451 | 0 | 0 |
| −0.025 | 113.669458 | −0.001993 | −66.43333324 |
| −0.05 | 113.667466 | −0.003985 | −132.8333326 |
| −0.075 | 113.665474 | −0.005977 | −199.2333307 |
| −0.1 | 113.663482 | −0.007969 | −265.6333271 |
| 0.025 | 113.6734439 | 0.0019929 | 66.4299999 |
| 0.05 | 113.675436 | 0.003985 | 132.8333326 |
| 0.075 | 113.6774299 | 0.0059789 | 199.296664 |
| 0.1 | 113.679423 | 0.007972 | 265.7333271 |

Figure 9:
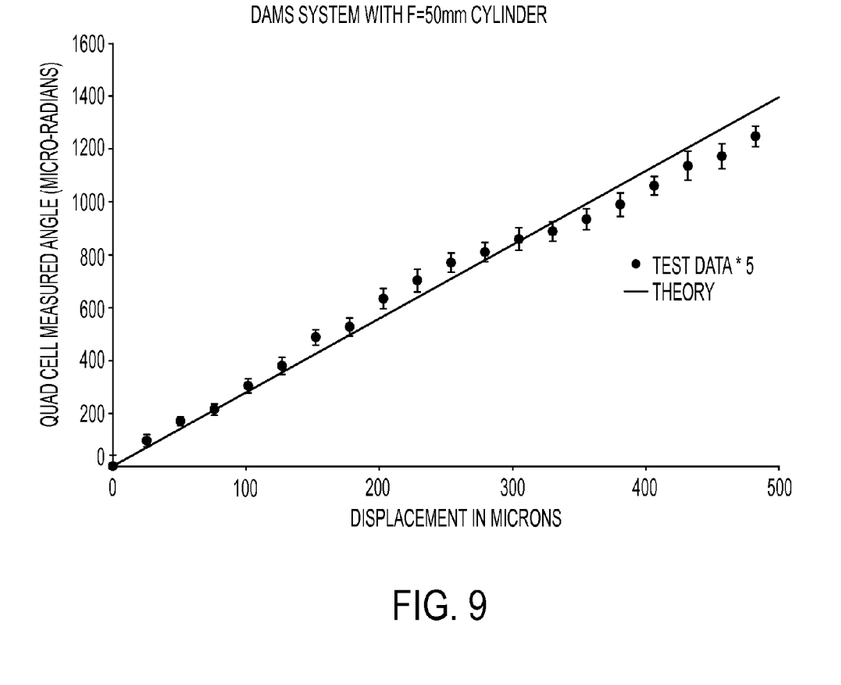
FIG. 9 is a plot of measured angles from a quad cell receiver versus displacement of an object, in accordance with an embodiment of the present invention.

Data from the proof of principle test is shown in FIG. 9, as quad cell measured angle versus displacement. The test data yields a linear relationship with zero intercept and a slope of m, as follows:

$$m = 2.79 \cdot \frac{\text{micro-radians}}{\text{micron}} \quad \text{Equation 33}$$

Equation 33 is in very close agreement with equations 31 and 32, considering the limited equipment available to perform the proof of principle test. Agreement, however, is better than 5%. The slight non-linearity in the data is believed to be caused by the translation stage rolling on ball bearings. Imperfections in the ball bearings may cause the slight wave in the data (in the micro-radian world, even small imperfections may cause waves). A better test setup would be to use a translation stage that moves via flexures.

Figure 10:
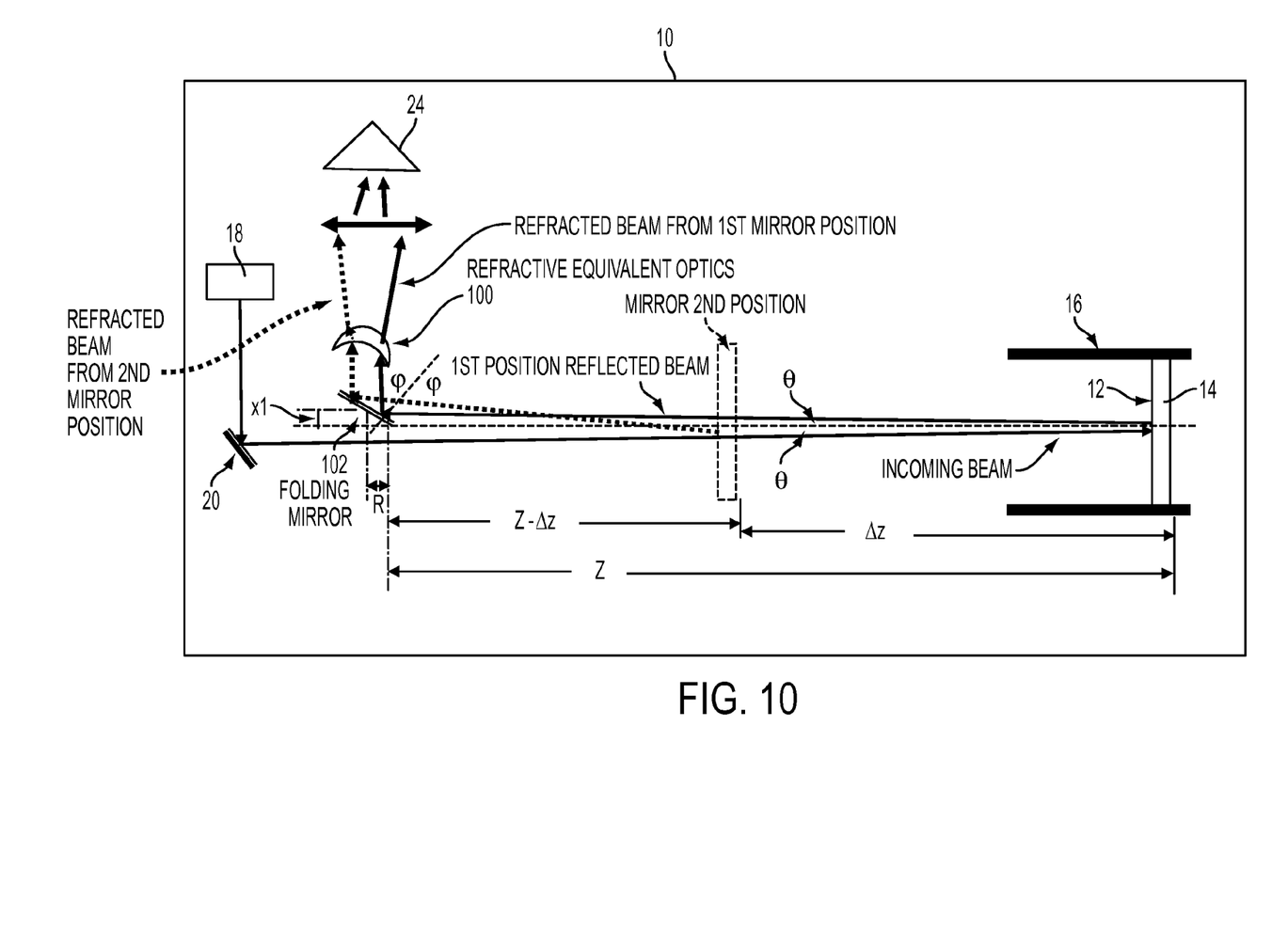
FIG. 10 is a diagram of a path undertaken by a beam of light between an optical source and an optical receiver in a distance to angle metrology system (DAMS), which includes a refractive optic, in accordance with yet another embodiment of the present invention.

Referring next to FIG. 10, there is shown another embodiment of the present invention. As shown, FIG. 10 includes features similar to the features shown in FIG. 1. An exception, however, is that optical bench 10 uses a refractive optic, designated as 100, in lieu of the reflective optic 22 shown in FIG. 1. A folding mirror, designated as 102 is also included to bend the incoming beam and reflect it toward refractive optic 100. As shown, the incoming beam impinges upon mirror 12, at a first mirror position and at a second mirror position. The mirror is shown as having moved by a distance of Δz, thereby forming a first reflected beam and a second reflected beam, respectively. The first reflected beam is transmitted through the refractive optic to form the first refracted beam; and the second reflected beam is transmitted through the refractive optic to form the second refracted beam.

Figure 11A:
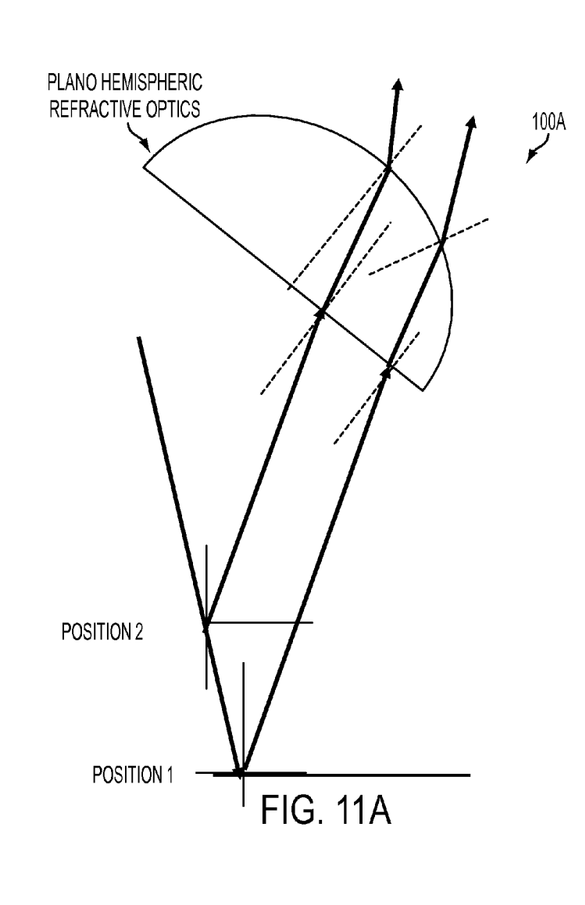
FIGS. 11A and 11B are exemplary diagrams of rays of light striking two different refractive optics at two positions, due to movement of an object under test from one position to another position, in accordance with an embodiment of the present invention.
Figure 11B:
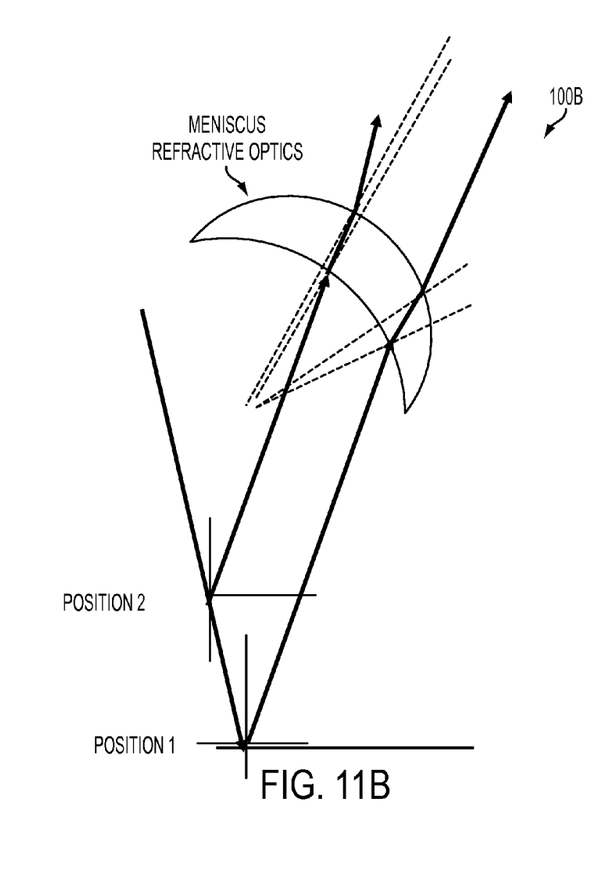

Two different refractive optics are shown in FIGS. 11A and 11B. The plano hemispheric refractive optic is designated as 100A and the meniscus refractive optic is designated as 100B. Also shown are two refracted beams transmitted through each refractive optic at two different positions, due to movement of the object under test.

It will be appreciated that the term "optic" may include one optical element or multiple optical elements. Thus, the refractive optic shown in FIGS. 10A, 10B and 11 may be formed with several optical elements in order to achieve equivalence to the reflective optic shown in FIG. 1.

The present invention may be used to measure precise movement or motion of a remotely located component or sensor (the object or target) in a variety of environments including components or sensors within a laboratory, inside a vacuum chamber, inside a cryogenic cold box, behind a very narrow band-limited optical filter, etc.

In addition, the present invention may be used to sense motion in a variety of dynamic or vibrating systems, such as spacecraft, automobiles, trucks, helicopters, or airplanes. This sensed motion may then be used as part of a fire control system, an inertial navigation system, etc.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for measuring movement of an object comprising:
    a source of light for emitting a beam,
    an object for receiving the beam from the source and reflecting the beam,
    a reflective optic for receiving the beam reflected from the object and reflecting the beam at a first angle, and
    a receiver for receiving the reflected beam from the reflective optic,
    wherein when the object moves in distance, by an amount less than 600 microns, the reflective optic reflects the beam at a second angle, and
    the receiver measures movement of the object, based on a difference between the first angle and the second angle.

2. The system of claim 1 wherein
the reflective optic is a cylindrical reflective optic.

3. The system of claim 1 wherein
the reflective optic is a spherical reflective optic.

4. The system of claim 1 wherein
the receiver includes a quad-cell imaging system.

5. The system of claim 1 wherein
the receiver includes a focal plane array (FPA).

6. The system of claim 1 wherein
the source of light includes a laser.

7. The system of claim 1 wherein
the source of light includes a collimated beam source.

8. The system of claim 1 wherein
the object includes a reflective surface for receiving and reflecting the beam at an angle of theta (θ) with respect to a normal direction from the reflective surface.

9. The system of claim 8 wherein
the reflective surface includes a mirror mounted on the object for receiving and reflecting the beam.

10. The system of claim 1 wherein
the beam is reflected from the object to strike the reflective optic at the first angle with respect to a normal direction from the reflective optic, and the first angle is formed before movement of the object (Δz=0), and
the beam is next reflected from the object to strike the reflective optic at the second angle with respect to a normal direction from the reflective optic, and the second angle is formed after movement of the object by a distance of Δz.

11. The system of claim 1 wherein
an adjustable lens is disposed between the source of light and the target for focusing the beam of light at a location adjacent to the reflective optic.

12. The system of claim 11 wherein
the adjustable lens includes a mirror.

13. The system of claim 1 wherein
the object is disposed inside a cold box, and
the reflective optic is disposed outside of the cold box.

14. The system of claim 10 wherein
the object is subject to movement in a z-direction,
the reflective optic includes a circular portion of radius R, the radius and the z-direction formed in the same plane,
the reflective optic is configured to receive the beam from the object at a first location along the circular portion, when the object movement is zero in the z-direction, and
the reflective optic is configured to receive the beam from the object at a second location along the circular portion, when the object moves by a distance of Δz in the z-direction, and
the receiver receives the beam from the first location and the second location and determines the distance Δz.

15. The system of claim 1 wherein
the reflective optic includes a cylindrical reflective optic having a radius of R, or a spherical reflective optic having a radius of R.

16. The system of claim 10 wherein
the receiver is configured to receive the beam from the first location at a first angle with respect to a normal extended from the reflective optic in the plane, and receive the beam from the second location at a second angle with respect to another normal extended from the reflective optic in the plane, and
the receiver determines the distance Δz based on a difference between the first angle and the second angle.

17. The system of claim 1 wherein
the refractive optic includes a plano hemispheric refractive optic.

18. The system of claim 1 wherein
the refractive optic includes a meniscus refractive optic.

* * * * *